United States Patent [19]

Clark et al.

[11] Patent Number: 4,719,159

[45] Date of Patent: Jan. 12, 1988

[54] SEALED LITHIUM BATTERY

[75] Inventors: Peter S. Clark, Penfield; Richard T. Cataldi, Webster, both of N.Y.

[73] Assignee: Eastman Kodak Company, Rochester, N.Y.

[21] Appl. No.: 864,385

[22] Filed: May 19, 1986

[51] Int. Cl.[4] .................. H01M 2/04; H01M 2/06
[52] U.S. Cl. .................. 429/159; 429/160; 429/177
[58] Field of Search .................. 429/177, 159, 160

[56] References Cited

U.S. PATENT DOCUMENTS

| 3,075,036 | 1/1963 | Shank et al. | 429/160 |
|---|---|---|---|
| 3,235,412 | 2/1966 | Shannon | 429/160 |
| 3,600,233 | 8/1971 | Coffey et al. | 136/134 R |
| 3,947,953 | 4/1976 | Okada et al. | 29/588 |
| 4,017,568 | 4/1977 | Ouirk | 264/27 |
| 4,029,855 | 6/1977 | Dougherty | 429/82 |
| 4,121,017 | 10/1978 | Dougherty et al. | 429/7 |
| 4,150,201 | 4/1979 | Silveyra | 429/176 |
| 4,171,564 | 10/1979 | Acton et al. | 29/623.2 |
| 4,259,419 | 3/1981 | Uba et al. | 429/174 |
| 4,371,597 | 2/1983 | Ikeda et al. | 429/153 |
| 4,374,080 | 2/1983 | Schroeder | 264/102 |
| 4,624,902 | 11/1986 | deNeufville et al. | 429/194 |

FOREIGN PATENT DOCUMENTS

| 0710175 | 7/1941 | Fed. Rep. of Germany | 429/160 |
|---|---|---|---|
| 0208506 | 5/1923 | United Kingdom | 429/160 |
| 0510238 | 7/1939 | United Kingdom | 429/160 |

*Primary Examiner*—John F. Niebling
*Assistant Examiner*—Steven P. Marquis
*Attorney, Agent, or Firm*—Donald D. Schaper

[57] ABSTRACT

A battery is disclosed which comprises a container having a plurality of cell cavities and folded generally flat electrodes in each of the cavities. A container cover is affixed to the container to seal the cell cavities. In order to provide a fluid-tight battery, the container cover includes a plurality of electrically-conductive inserts sealed therein which form intercell electrical connections and the electrical connections between the cells and the battery terminals.

19 Claims, 7 Drawing Figures

SEALED LITHIUM BATTERY

CROSS-REFERENCE TO RELATED APPLICATION

Reference is made to commonly-assigned U.S. patent application Ser. No. 864,386, entitled Method of Making a Battery, filed in the name of Clark et al., on even date herewith.

BACKGROUND OF THE INVENTION

1. Field of the Invention

The present invention relates to a battery, and more particularly, to a hermetically-sealed, portable battery.

2. State of the Prior Art

Various arrangements have been used in small multi-cell batteries to minimize the internal resistance and to prevent electrolyte from leaking from the cells. It is known, for example, to form completely sealed individual cells and to then electrically join the individual cells to produce a battery of a desired voltage. Although such a construction is effective to prevent leakage, it is too complex and expensive for most applications.

It is also known to construct a multicell battery with integrally formed cells. In U.S. Pat. No. 4,121,017, there is disclosed a battery which includes separate cell compartments formed in a molded plastic container. Each of the compartments comprises a pair of electrodes, and a container cover is sealed over the compartments. Adjacent cells are electrically connected through a common wall, and the battery terminals are joined to the cells through connections in special channels at opposite sides of the battery. A problem with this battery is that all of the electrical connections are made through the walls of the cells. This type of construction increases the cost of the battery, and it is very difficult to insure that the connections made through the cells walls are leakproof.

SUMMARY OF THE INVENTION

It is an object of the present invention to overcome the problems in the prior art discussed above and to provide a leakproof battery of an improved construction.

In accordance with one aspect of the invention, there is provided a battery comprising: a container having a cell cavity therein and an anode and a cathode in the cavity; and a cover fixed to the container to hermetically seal the cavity, the cover having electrically conductive inserts sealed therein, one of the inserts being connected to the anode and another of the inserts being connected to the cathode.

In one embodiment of the invention, a battery comprises a molded container having three cell cavities. Each of the cell cavities contains a folded electrode assembly, and a battery cover hermetically seals the cell cavities. The battery cover has stainless steel inserts sealed therein which are joined to the electrodes in the cell cavities to form intercell connections and the connections between the cells and the battery terminals.

The battery of the present invention is shock resistant, hermetically sealed, and extremely durable. These advantages are achieved as a result of an integrated construction in which the electrical connections of the battery are made by conductive inserts in the container cover of the battery. Such a construction is particularly suitable for batteries, such as lithium-manganese oxide batteries, in which the electrolytes are especially difficult to contain. A further advantage of the present invention is that, since very little space is used for the electrical connections, a large proportion of the internal volume can be used for the cells. Thus, for a given size of battery, the battery capacity can be greater.

Other features and advantages will become apparent from reference to the following description of the preferred embodiment when read in light of the attached drawings.

DESCRIPTION OF THE PREFERRED EMBODIMENT

Figure 1:
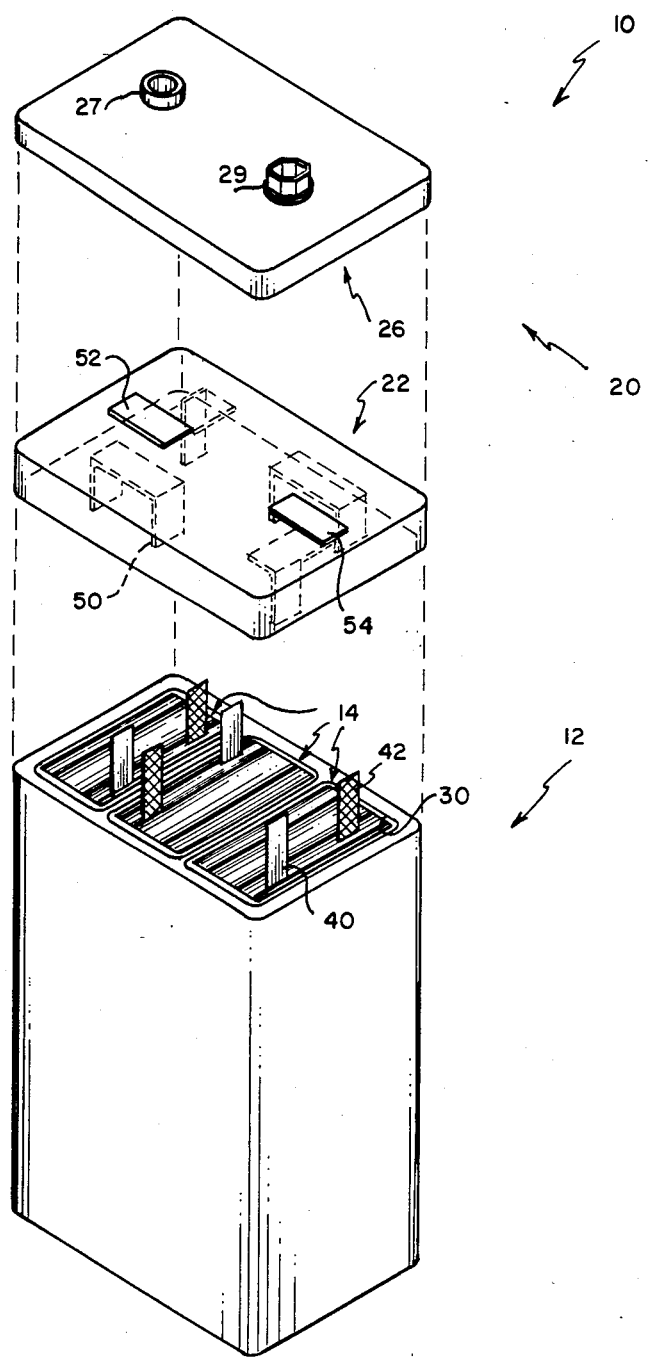
FIG. 1 is an exploded perspective view of a battery made by the present invention.
Figure 2:
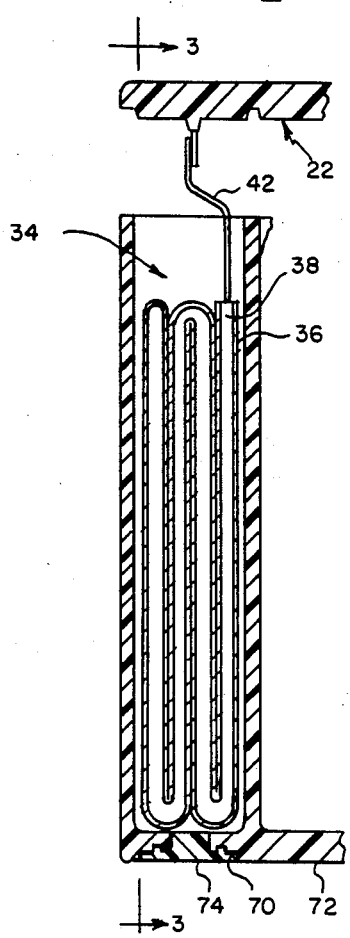
FIG. 2 is an elevational view, in section, of a single cell of the battery.
Figure 3:
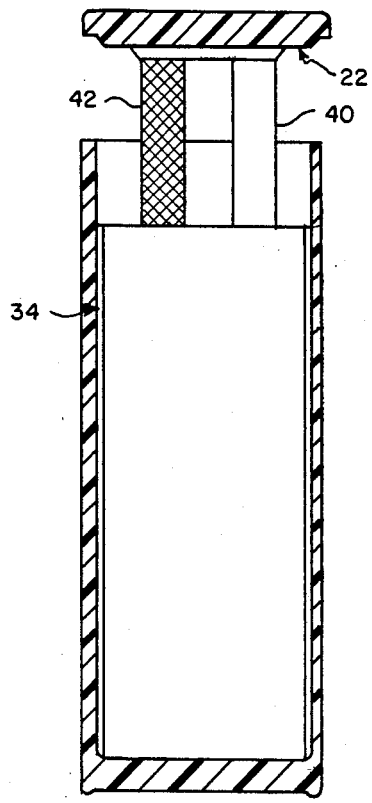
FIG. 3 is a sectional view taken along the line 3—3 in FIG. 2.
Figure 4:
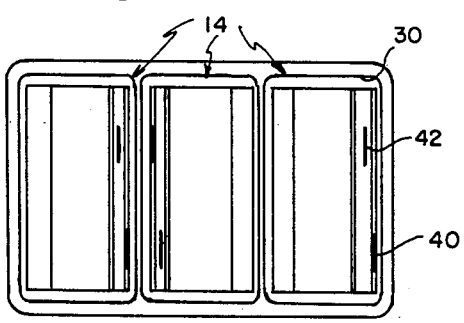
FIG. 4 is a top plan view of the container, showing the arrangement of the electrodes in the cell cavity.

The present invention is described hereinafter with regard to a lithium-manganese oxide battery. It will be apparent, however, that the invention is also applicable to other types of batteries. With reference to FIG. 1, there is shown a battery 10 constructed in accordance with the present invention. Battery 10 comprises a container 12 which includes three cells 14. A battery cover 20 is affixed to container 12 and includes a container cover 22 and a terminal plate 26. A positive terminal 27 and a negative terminal 29 are provided on terminal plate 26 for connecting battery 10 to an electrically-powered device (not shown).

Container 12 can be formed by injection molding from a material such as polypropylene having a reinforcing filler of, for example, chopped glass. Container 12 is formed with three cavities 30. As shown in FIGS. 1–4, each of the cell cavities 30 contains an electrode assembly 34 which includes an anode 36 and a cathode 38. Anode 36 can be formed as a laminate structure (not shown) having two or three layers in which lithium is coated on a one mil stainless steel foil current collector. A portion of the stainless steel foil is left uncoated to form an anode terminal 40. A porous electrically-insulating material, such as Celgard ™ 4510, is rolled over the lithium to form a separator. Cathode 38 is also a laminate structure (not shown) and comprises a stainless steel grid collector coated on one or both sides with a mixture of $MnO_2$, carbon and Teflon ™. A small portion of the collector is left uncoated to function as a cathode terminal 42. Electrode assembly 34 is formed by positioning a cathode 38 on top of an anode 36 such that they are not in electrical contact, and folding the assembly into a form which can be inserted in a cavity 30. One example of such a form is the accordian-folded electrode assembly 34 shown in FIG. 2. A more complete description of the electrode assembly 34 is provided in U.S. application Ser. No. 735,406, filed on May 17, 1985, in the name of Bakos et al. It is preferred to incorporate a thermal fuse (not shown) in electrode assembly 34 to insure against the rupture of container 12 in the event of a short circuit or other malfunction. A suitable fuse is disclosed in U.S. application Ser. No. 864,376, entitled Battery Separator Assembly, filed on even date herewith.

Cover 22 comprises two U-shaped inserts 50 which form the electrical connections between adjacent cells 14 to connect the cells in series. Cover 22 also contains inserts 52 and 54 which form the electrical connections between cells 14 and the terminal plate 26. Insert 52 forms the connection between a cathode 38 and battery terminal 27, and insert 54 forms the connection between an anode 36 and battery terminal 29.

Figure 5:
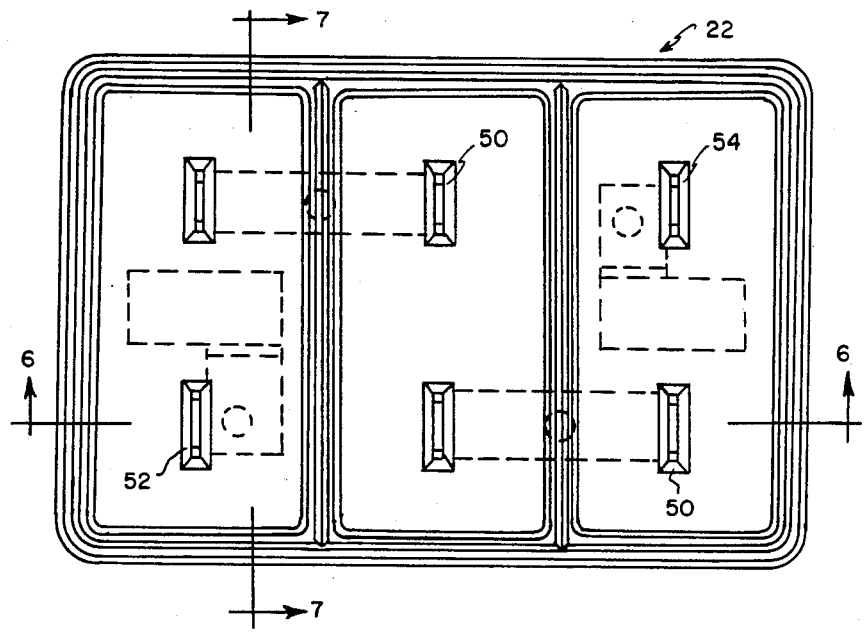
FIG. 5 is a bottom plan view of the container cover.
Figure 6:
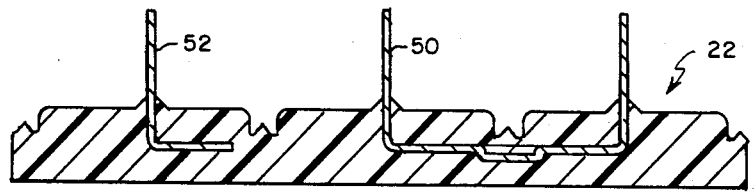
FIG. 6 is a sectional view, taken along the line 6—6 in FIG. 5.
Figure 7:
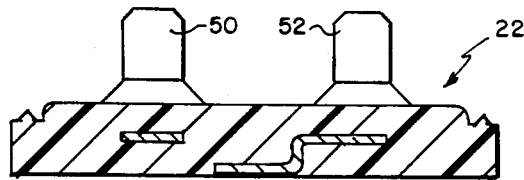
FIG. 7 is a sectional view, taken along the line 7—7 in FIG. 5.

Container cover 22, as shown in FIGS. 5-7, is formed of a dielectric plastic material with inserts 50, 52 and 54 sealed therein to obtain a fluid-tight cover 22 which can be used to form the electrical connections between the cells 14 and between the cells 14 and the battery terminals 27 and 29. One method of making container cover 22 is to form the cover 22 by injection molding. In forming cover 22 by this method, inserts 50, 52 and 54 are positioned in a mold (not shown). The inserts 50, 52 and 54 are then heated to a temperature sufficient to activate the chemical bonding between the metal of the insert and the plastic material. The inserts 50, 52 and 54 are heated by hydrogen fueled jets (not shown) to a temperature of at least 400° F.; after the heating, plastic material, at a temperature of between about 375° F. and about 475° F., is injected into the mold to form cover 22. It has been found that chemically modified polyolefins are particularly suitable for forming cover 22. A preferred such material is Polybond TM 1016 chemically modified polyolefin, sold by B. P. Perfomance Polymers Inc., Hackettstown, N.J. A preferred material for inserts 50, 52 and 54, is stainless steel, type 304. Cover 22 can also be formed from Polybond TM 1001 chemically modified polyolefin, sold by B. P. Performance Polymers, Inc., or from Plexar TM 2511 chemically modified polyolefin, sold by Norchem Co. Inserts 50, 52 and 54 can also be made from aluminum or copper.

Terminal plate 26 is formed by injection molding from a material such as polypropylene. Battery terminals 27 and 29 extend through plate 26 and are fixed thereto by, for example, riveting.

In the assembly of battery 10, cover 22 is positioned over container 12, and the inserts 50, 52 and 54 are joined to cathodes 38 and anodes 36 in the cells 14. In the lithium-MnO₂ battery described herein, each of the cells 14 produces 3V and the cells 14 are connected in series to form a 9V battery. When the electrical connections have been made, the cover 22 is ultrasonically welded to the container 12. Electrolyte is added into each of the cells 14 through openings 70 (FIG. 2) in a bottom wall 72 of container 12. Openings 70 are closed by plastic plugs 74 which are ultrasonically welded to wall 72.

Preferred electrolytes for battery 12 are electrolytes comprising, for example, a solvent mixture of a propylene carbonate and dimethoxyethane used with a lithium salt such as lithium tetrafluoroborate, or a solvent mixture of butyrolactone and dimethoxyethane used with a lithium salt such as lithium tetrafluoroborate (LiBF$_4$) or lithium trifluoromethanesulfonate (LiCF$_3$SO$_3$). One suitable electrolyte would be an electrolyte containing 1M LiBF$_4$ in a solvent mixture of 4-butryrolactone and dimethoxyethane. Another suitable electrolyte would contain 1M LiCF$_3$SO$_3$ in a solvent mixture of 4-butyrolactone and dimethoxyethane.

Terminal plate 26 is electrically connected to cover 22 by connecting leads (not shown) from terminals 27 and 29 to inserts 52 and 54 respectively. In a final step, terminal plate 26 is affixed to cover 22 by, for example, ultrasonic welding.

The invention has been described in detail with particular reference to a preferred embodiment thereof, but it will be understood that variations and modifications can be effected within the spirit and scope of the invention.

We claim:

1. A battery comprising:
   a container having a plurality of cell cavities;
   an electrode assembly in each of said cavities including a pair of electrodes and a separator material between the electrodes, one of said electrodes in each pair being a lithium anode;
   an electrolyte in each of said cell cavities, said electrolyte containing a lithium salt;
   a cover on said container and fused thereto to hermetically seal each of said cell cavities, said cover being formed from a chemically modified polyolefin and having conductive inserts molded therein, said inserts being bonded to said polyolefin, and said inserts forming electrical connections between electrodes in adjacent cell cavities and between electrodes and battery terminals.

2. A battery, as defined in claim 1, wherein said container is formed from polypropylene having a reinforced filler therein.

3. A battery, as defined in claim 1, wherein said electrode assembly is formed from folded generally flat electrodes.

4. A battery, as defined in claim 1, wherein a generally U-shaped insert forms the electrical connection between electrodes in adjacent cell cavities.

5. A battery, as defined in claim 1, wherein the other electrode in each pair of electrodes is a MnO$_2$ cathode.

6. A battery, as defined in claim 1, wherein said separator material is a porous electrically-insulating material.

7. A battery, as defined in claim 6, wherein said electrolyte contains LiBF$_4$ in a solvent mixture of 4-butyrolactone and dimethoxyethane.

8. A battery, as defined in claim 6, wherein said electrolyte contains LiBF$_4$ in a solvent mixture of propylene carbonate and dimethoxyethane.

9. A battery, as defined in claim 6, wherein said electrolyte contains LiCF$_3$SO$_3$ in a solvent mixture of 4-butyrolactone and dimethoxyethane.

10. A battery, as defined in claims 7, 8 or 9, wherein said container has three cell cavities.

11. A battery, as defined in claim 1, wherein said inserts are stainless steel.

12. A battery, as defined in claim 1, wherein said inserts are aluminum.

13. A battery, as defined in claim 1, wherein said inserts are copper.

14. A battery, as defined in claim 1, wherein said polyolefin is Polybond TM 1016 chemically modified polyolefin.

15. A battery, as defined in claim 1, wherein said polyolefin is Polybond TM 1001 chemically modified polyolefin.

16. A battery, as defined in claim 1, wherein said polyolefin is Plexar 2511 chemically modified polyolefin.

17. A battery, as defined in claim 1, wherein two of said inserts extend from a side of said cover bounding said cell cavities to an opposite side of the cover.

18. A battery, as defined in claim 17, wherein a terminal plate is bonded to said cover, and said terminal plate has a positive terminal connected to one of said two inserts and a negative terminal connected to the other of said two inserts.

19. A battery comprising:
a container having a plurality of cell cavities, said container being formed from polypropylene having a reinforcing filler therein;
a pair of folded electrodes in each of said cavities, one of said electrodes being a lithium anode and the other of the electrodes being a $MnO_2$ cathode;
an electrolyte in each of said cell activities;
a cover on said container and fused thereto, said cover being formed from a polyolefin and having stainless steel inserts molded therein, said inserts being bonded to said polyolefin, said cover having battery terminals thereon, and said inserts forming electrical connections between electrodes in adjacent cell cavities and between electrodes and said battery terminals.

* * * * *